3,150,169
BISULFITE ADDITION USING A PERESTER-IRON SALT INITIATOR
Elmer E. Johnson, San Rafael, and Robert T. Adams, Lafayette, Calif., assignors to California Research Corporation, San Francisco, Calif., a corporation of Delaware
No Drawing. Filed Dec. 30, 1960, Ser. No. 79,588
3 Claims. (Cl. 260—513)

The present invention relates to an improved process for the free radical addition of bisulfite ion to unsaturated organic compounds. More particularly, the invention provides an improved process for bisulfite addition by employing a synergistic combination of compounds as a free radical initiator, namely, an organic perester and a water-soluble iron salt.

It has long been known that bisulfite can be added to unsaturated organic compounds in the presence of a reaction-initiating compound such as a peroxide or a perester. Ferrous salts have been used to accelerate the effect of certain peroxide initiators in reactions other than bisulfite addition, such as the oxidation of polyphenols, catalytic dehydrogenations effected by peroxides, etc. It has been found, however, that these salts have little, if any, accelerating effect upon these peroxide initiators when they are used for initiating bisulfite addition reactions.

Contrary to expectations based on the prior art, however, it has now been found that a perester-initiated bisulfite addition reaction can be measurably accelerated by use of a water-soluble iron salt along with the perester. This unexpected acceleration provided by the combination of a perester and an iron salt is believed to be unique to this particular combination. Accordingly, the water-soluble salts of nickel, copper, cobalt, chromium, magnesium and aluminum, in combination with t-butyl perbenzoate, give no appreciable accelerating effect; nor can this rate increase be realized from using a water-soluble salt of iron in combination with other known free radical initiators, i.e., the organic peroxides, such as dibenzoyl peroxide, di-t-butyl peroxide, t-butyl hydroperoxide, cumene hydroperoxide, or methylethylketone peroxide for bisulfite addition.

The novel process of the invention comprises the free radical addition of bisulfite ion to unsaturated organic compounds using a synergistic initiator combination comprising an organic perester and a water-soluble iron salt. Only when the synergiestic initiator combination of the invention—iron and an organic perester—was used were the outstanding results of this invention obtained.

The process of the invention is applicable to any free radical bisulfite addition to unsaturated organic compounds. A preferred embodiment of the invention comprises the bisulfite addition to olefins. In this preferred embodiment, the olefinic materials used for the preparation of the sulfonated products by the novel process of the invention can be any of a broad class of terminally or internally unsaturated olefins, regardless of the molecular structure or nature of the olefin. Preferred feed stocks are terminal olefins having between 5–20 carbon atoms in the molecule from which the highly desirable primary alkyl sulfonates may be prepared.

The bisulfite ion used may be ammonium bisulfite, amine bisulfites, and alkali metal or alkaline earth metal bisulfites, such as sodium, potassium, calcium, strontium, magnesium, etc.; the alkali metal and ammonium bisulfites are preferred. The bisulfite ion is generally employed in the form of an aqueous solution. The concentration of bisulfite in this solution is limited only by the water solubilities of the respective bisulfites at the temperature involved. Additional amounts of water, however, may be employed to optimize the amount of bisulfite in solution after the bisulfite solution has been admixed with the olefin mixture. In practice, solutions of bisulfite ion in concentrations of about 1 molar to about 6 molar have been found satisfactory.

In carrying out the invention, a batch, semi-continuous or fully continuous process may be employed. In a batch process, at the start there are usually three phases present. The first phase contains predominantly olefin and solvent; the second phase is an aqueous solvent phase containing olefin and dissolved bisulfite; the third phase is essentially an aqueous solution of bisulfite. However, when the concentration of bisulfite in the reaction mixture is sufficiently small, the third phase may not exist at all. After the reaction has proceeded so as to form a substantial amount of sulfonated olefin, the phase relationships change so that only one phase containing both reactants and product remains. A continuous process may be carried out by controlling the addition of bisulfite so that, after the reaction is sufficiently under way, a one-phase system is continuously maintained which contains both reactants and products.

Because of the low solubility in water of a major portion of the olefins to be treated, a sufficient amount of organic solvent to dissolve all the olefin is employed. This solvent in anhydrous or aqueous form is an alcohol, e.g., methanol, ethanol, isopropanol, or n-propanol, or a combination thereof such as commercially available Formula 3A alcohol containing about 86 percent ethanol. In practice, the amount of solvent present in the reaction can vary from about 100 to 1000 weight percent of the olefin or more. For a batch process, a suitable reaction mix for most purposes can be obtained by employing an aqueous solution of the organic solvent in concentrations such that after the total amount of aqueous solution of bisulfite ion is included in the reaction mix, the alcohol-water ratio is from about 1:3 to about 9:1, preferably 1:2 to about 6:1. Thus, a 1:1 ratio of 3A alcohol to water provides a good solubilizing effect for both the olefin and the bisulfite.

Because of the superior initiation obtained by the novel synergistic initiator of the invention, the time at which the bisulfite solution is added and its manner of addition, whether added at once or in stages, is not critical either in a batch or continuous process. Bisulfite ion is always present, however, in the reaction mixture so that the reaction may proceed. If bisulfite is to be added gradually during the course of the reaction, the need for further addition may be ascertained by periodic withdrawal of samples of reaction mixture for analysis of free bisulfite content by means of iodine titration.

Similarly, while the choice of a suitable organic perester in the reaction mixture is not critical, certain peresters have been found to yield superior results. Accordingly, preferred organic peresters are the aliphatic and aromatic peresters in which the peroxy group is attached to at least one tertiary carbon atom, such as t-butyl perbenzoate, t-butyl pertoluate, and t-butyl perphthalate, suitable amounts of which range from about 0.001 to 0.1 mol per mol of olefin, with preferred amounts ranging from 0.005 to 0.02 mol per mol of olefin. t-Butyl perbenzoate has been found to give an outstanding synergistic initiating effect when used as described in this invention in combination with a water-soluble iron salt.

It was surprsingly discovered that the synergistic initiation accelerating effect of this invention could be obtained with either ferric or ferrous iron salts with an organic perester. Accordingly, water-soluble iron salts, such as $FeSO_4$, $Fe_2(SO_4)_3$, $FeCl_2$, and $FeCl_3$ are suitable, ferric salts being preferred. The amount of iron required is at least 0.2 mol per mol perester. Amounts considerably in excess of this may be employed, but the rate increase realized from the use of additional iron above about 10.0 mols iron per mol perester tends to be minimal. Larger amounts than this are difficult to remove from the product and are therefore to be avoided. In practice, 1.0–10.0 mols iron per mol perester are generally employed.

Control of pH is not essential to the novel process of the invention. Successful sulfonation has been carried out with a pH as high as 6.5–7.5, and as low as 3.5. In general, it is preferred to operate at a pH of about 4.5–6.5.

In batch operation, it has also been found advantageous to carry out the reaction in the presence of a small amount, up to about 15 mol percent based on the olefin to be reacted, of preformed sulfonate such as that obtained as product.

The temperature employed during the reaction can vary widely, from a low of about 20° C. to a high of about 200° C. For the preferred organic perester initiators, temperatures ranging from about 40° C. to 80° C. are found to be highly suitable.

The recovery of the sulfonate prepared according to the process of the invention may be simply accomplished by evaporating or otherwise removing the solvent and the water. If desired, following the sulfonation reaction, a solvent deoiling step may be employed to remove unreacted hydrocarbons. These may be removed by extraction with a light hydrocarbon such as n-pentane, or by dilution with water to effect the phase formation of the oil and sulfonate followed by a phase separation such as by decantation. Solvent and water may then be removed from the sulfonate layer by distillation or evaporation.

A desalting step may be employed, either directly upon the crude reaction product or upon the deoiled sulfonate to remove any remaining salts such as bisulfates or sulfates formed in the reaction. Desalting of the crude sulfonate may be effected by cooling the mixture and allowing the salt to crystallize. Seed crystals may be used, if desired. Desalting of the deoiled product may be accomplished by contacting said product with a suitable desalting solvent such as n-propanol, after which the solvent is removed by distillation.

As an illustration of the process of the invention and the uniqueness of its application, the following examples are presented. It is to be understood, however, that these examples are merely representative and illustrative of the inventive process, variations being possible within the scope of the invention as herein disclosed. Accordingly, the limitations expressed in these specific examples are not to be construed as further limitations on the scope of the invention.

*Example 1*

A mixture of 13.55 g. $C_{10}$–$C_{20}$ primary olefins, 121.7 g. sodium bisulfite, 0.202 g. t-butyl perbenzoate initiator (0.016 mol per mol olefin), 174 g. water, and 168 g. Formula 3A alcohol (about 86 percent ethanol) was charged to a reactor and heated to 160° F. The amount of alkyl sulfonate product formed after 2 hours reaction time was measured and showed a conversion of 14.5 percent.

*Example 2*

This same procedure was repeated six more times except that in each run a small amount (at least $5 \times 10^{-5}$ mols) of one of the following water-soluble metal salts was included in the reaction mixture:

| | |
|---|---|
| (1) | $Ni(NO_3)_2 \cdot 6H_2O$ |
| (2) | $CuSO_4$ |
| (3) | $CoSO_4 \cdot 7H_2O$ |
| (4) | $Cr_2(SO_4)_3 \cdot nH_2O$ |
| (5) | $MgSO \cdot nH_2O$ |
| (6) | $Al_2(SO_4)_3 \cdot 18H_2O$ |

The results obtained in each run were similar to those obtained in Example 1, no appreciable rate increase being observed from the use of any of these water-soluble metal salts.

*Example 3*

Example 1 was again repeated except that $6.6 \times 10^{-5}$ mol of ferrous sulfate (0.001 mol iron per mol olefin) was included in the mixture. In only 1½ hours as compared to the 2 hours of Example 1, a 44.2 percent conversion to product was obtained as compared to 14.5 percent in Example 1. This example shows at least a threefold increase in reaction rate by the use of the process of the invention.

*Example 4*

Example 1 was again repeated, this time using $2.15 \times 10^{-5}$ mol of ferric sulfate (0.00066 mol iron per mol olefin). After 1½ hours, an 81.4 percent conversion was realized. This represents over a five-fold increase in rate over the process carried out without the iron.

*Example 5*

Six duplicate mixtures of 25.1 g. $C_{10}$–$C_{20}$ primary olefins, 54.0 g. ammonium bisulfate, 10.7 g. water and 21.0 g. Formula 3A alcohol (about 86 percent ethanol) were prepared, each pair containing 0.00392 mol of one of the following initiators:

(1) t-Butyl perbenzoate (a perester)
(2) Benzoyl peroxide
(3) t-Butyl hydroperoxide
(4) t-Butyl peroxide
(5) Cumene hydroperoxide
(6) Methylethylketone peroxide To one member of each of the duplicate pairs of mixtures 0.002 g. ferrous sulfate was added. The reactions were allowed to proceed for about ½ hour after mixing at about 174° F. All five of the peroxide initiators showed a similar reaction rate without the iron which was considerably slower than the rate exhibited for the perester without the iron salt. The rate of reaction for each initiator without the iron salt was then compared with the rate of reaction for that same initiator but with the iron salt added. The peroxide initiators showed no appreciable rate increase by virtue of the addition of the iron salt. With the t-butyl perbenzoate, on the other hand, the only perester and the best of the six initiators tried, the rate was increased over sevenfold by the addition of iron.

As will be evident to those skilled in the art, various modifications on this process can be made or followed, in the light of the foregoing disclosure and discussion, without departing from the spirit or scope of the disclosure or from the scope of the following claims.

We claim:
1. In the process of contacting a hydrocarbon olefin and an aqueous solution of a bisulfite salt in the presence of an organic perester initiator to effect the free radical addition reaction of bisulfite ion to said hydrocarbon olefin, the improvement of carrying out the addition reaction in the presence of t-butyl perbenzoate and an iron salt selected from the group consisting of ferrous sulfate and ferric sulfate, said t-butyl perbenzoate being present in an amount of 0.001 to 0.1 mol per mol of olefin, and said salt being present in an amount of about 0.2 to 10 mols per mol of said t-butyl perbenzoate.

2. Process according to claim 8 wherein the t-butyl perbenzoate is present in an amount of 0.005 to 0.02 mol per mol of olefin and the iron salt is present in an amount of 1 to 10 mols per mol of t-butyl perbenzoate, the reaction being carried out at a temperature of about 40° C. to 80° C.

3. Process according to claim 2 wherein the reaction is carried out in the presence of a solvent in an amount of about 100 to 1,000 weight percent of the olefin.

References Cited in the file of this patent

UNITED STATES PATENTS

| | | |
|---|---|---|
| 2,318,036 | Werntz | May 4, 1943 |
| 2,504,411 | Harman | Apr. 18, 1950 |

FOREIGN PATENTS

| | | |
|---|---|---|
| 1,087,994 | France | Sept. 1, 1954 |

OTHER REFERENCES

Kharasch et al.: J. Org. Chem., vol. 15, 1950, pages 763–774.

Baxendale: Advances in Catalysis, vol. IV, Academic Press Inc., New York, 1952, pages 46–71.

Kharasch et al.: J. Am. Chem. Soc., vol. 81, 1959, pages 5819–5824.